United States Patent
Lastrucci

(10) Patent No.: US 10,951,088 B2
(45) Date of Patent: Mar. 16, 2021

(54) SYSTEM FOR CONTROLLING THE VIBRATION OF A PLATFORM

(71) Applicant: POWERSOFT S.P.A., Scandicci (IT)

(72) Inventor: Claudio Lastrucci, Scandicci (IT)

(73) Assignee: POWERSOFT S.P.A., Scandicci (IT)

( * ) Notice: Subject to any disclaimer, the term of this patent is extended or adjusted under 35 U.S.C. 154(b) by 196 days.

(21) Appl. No.: 16/292,726

(22) Filed: Mar. 5, 2019

(65) Prior Publication Data
US 2019/0288577 A1  Sep. 19, 2019

(30) Foreign Application Priority Data
Mar. 9, 2018 (IT) .......................... 102018000003406

(51) Int. Cl.
  *H02K 5/24* (2006.01)
  *H02K 33/16* (2006.01)
  *F16F 15/00* (2006.01)
  *H02K 5/15* (2006.01)
  *H04R 3/00* (2006.01)
  (Continued)

(52) U.S. Cl.
  CPC ........... *H02K 5/24* (2013.01); *A61H 23/0236* (2013.01); *B06B 1/045* (2013.01); *F16F 15/002* (2013.01); *H02K 5/15* (2013.01); *H02K 33/16* (2013.01); *H04R 3/007* (2013.01); *A61H 2203/0406* (2013.01); *A61H 2203/0431* (2013.01)

(58) Field of Classification Search
  CPC ............ H02K 5/24; H02K 33/16; H02K 5/15; H02K 33/00–33/18; H02K 35/00–35/06; A61H 23/0236; A61H 2203/0431; A61H 2203/0406; F16F 15/002; H04R 3/007; B06B 1/045; B06B 3/00; B06B 2201/53

USPC .................................. 310/51, 12.16, 15–39
  See application file for complete search history.

(56) References Cited

U.S. PATENT DOCUMENTS 3,917,914 A  11/1975  Parker
5,314,403 A * 5/1994  Shaw .................. A61H 23/0236
                                                                297/217.1

(Continued)

FOREIGN PATENT DOCUMENTS

WO   WO 2016/194762   12/1916
WO   WO 2013/136137   9/2013

OTHER PUBLICATIONS

IT 2018000003406, Search Report dated Nov. 15, 2018, 6 pages—English.

*Primary Examiner* — Thomas Truong
(74) *Attorney, Agent, or Firm* — Pearne & Gordon LLP

(57) ABSTRACT

A control system (1) controls the vibration of a platform (2), the platform is formed by a fixed lower support (2a), an upper support (2b) and a plurality of intermediate bodies (2c). The control system (1) includes at least one vibration generator (3) inside the platform (2) between intermediate bodies (2c) and comprising a stator body (4) and at least one vibrating body (5), made of material that is magnetic and concentric with respect to the stator body (4) and in a position that is radially external around the stator body (4), configured to vibrate the upper support (2b) with respect to the lower support (2a). The control system (1) also includes an electric circuit comprising a coil wound around the stator body (4) and designed to receive an audio and/or video signal to generate a magnetic field by the coil and designed to vibrate the at least one vibrating body (5) of the at least one vibration generator (3) as a function of the audio and/or video signal.

14 Claims, 3 Drawing Sheets

(51) Int. Cl.
*A61H 23/02* (2006.01)
*B06B 1/04* (2006.01)

(56) References Cited

U.S. PATENT DOCUMENTS

| | | |
|---|---|---|
| 5,624,155 A | 4/1997 | Bluen |
| 2014/0265648 A1 | 9/2014 | Crowson |

* cited by examiner

SYSTEM FOR CONTROLLING THE VIBRATION OF A PLATFORM

CROSS REFERENCE TO RELATED APPLICATIONS

This application relates to and claims priority from IT-102018000003406 filed Mar. 9, 2018, the entire contents of which are incorporated herein by reference.

FIGURE SELECTED FOR PUBLICATION

FIG. 1

BACKGROUND OF THE INVENTION

Field of the Invention

The present invention relates to system for controlling the vibration of a platform. More particularly the present invention relates to a control system for controlling the vibration of a platform and a control method for controlling the vibration of a platform while containing the structures and benefits herein.

Description of the Related Art

A platform is any surface designed to receive a user. In other words a platform could be the seating of a seat or the flooring of a room.

In particular, platforms are known that are made to vibrate in response to an audio and/or video signal.

Different industries exist where such platforms are used, such as, for example, the gaming, or the cinema or entertainment industry in general.

For example, seats exist that are used to simulate the driving cab of a motor vehicle in certain video games.

Such seats are able to vibrate so as to give the player the sensation of driving on a particular road, for example an unpaved road.

Another application example could be the seating for 4D cinemas where in addition to providing the user with a three-dimensional video and high definition audio a physical sensation is given in association with given scenes, such as for example action scenes where explosions dominate.

Another application example is provided by the flooring of discotheques where on the basis of the music it is desired to give the user certain feedback or the platforms of the dance games where certain points of the platform have to vibrate according to the piece of music to which the user is dancing.

Disadvantageously, known platforms are unable to provide sufficiently realistic feedback and the intensity of the vibration is not always able to create the illusion necessary to be given to the user.

Still more disadvantageously, known platforms are not always aligned on the audio and video and the vibration is often repetitive and disconnected from the action that is taking place on the screen or the piece of music that is being listened to.

Accordingly, there is a need for an improved system for controlling the vibration of a platform.

ASPECTS AND SUMMARY OF THE INVENTION

The technical task of the present invention is thus to make available a control system for controlling the vibration of a platform and a control method for controlling the vibration of a platform that are able to overcome the prior-art drawbacks that have emerged.

The object of the present invention is thus to make available a control system for controlling the vibration of a platform and a control method for controlling the vibration of a platform that are able to give the right feedback and the correct vibration intensity in response to an audio and/or video signal.

The defined technical task and the specified object are substantially achieved by a control system for controlling the vibration of a platform and a control method for controlling the vibration of a platform comprising the technical features set out in one or more of the attached claims.

Further features and advantages of the present invention will be clearer from the illustrative and thus non-limiting description of a control system for controlling the vibration of a platform and a control method for controlling the vibration of a platform.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
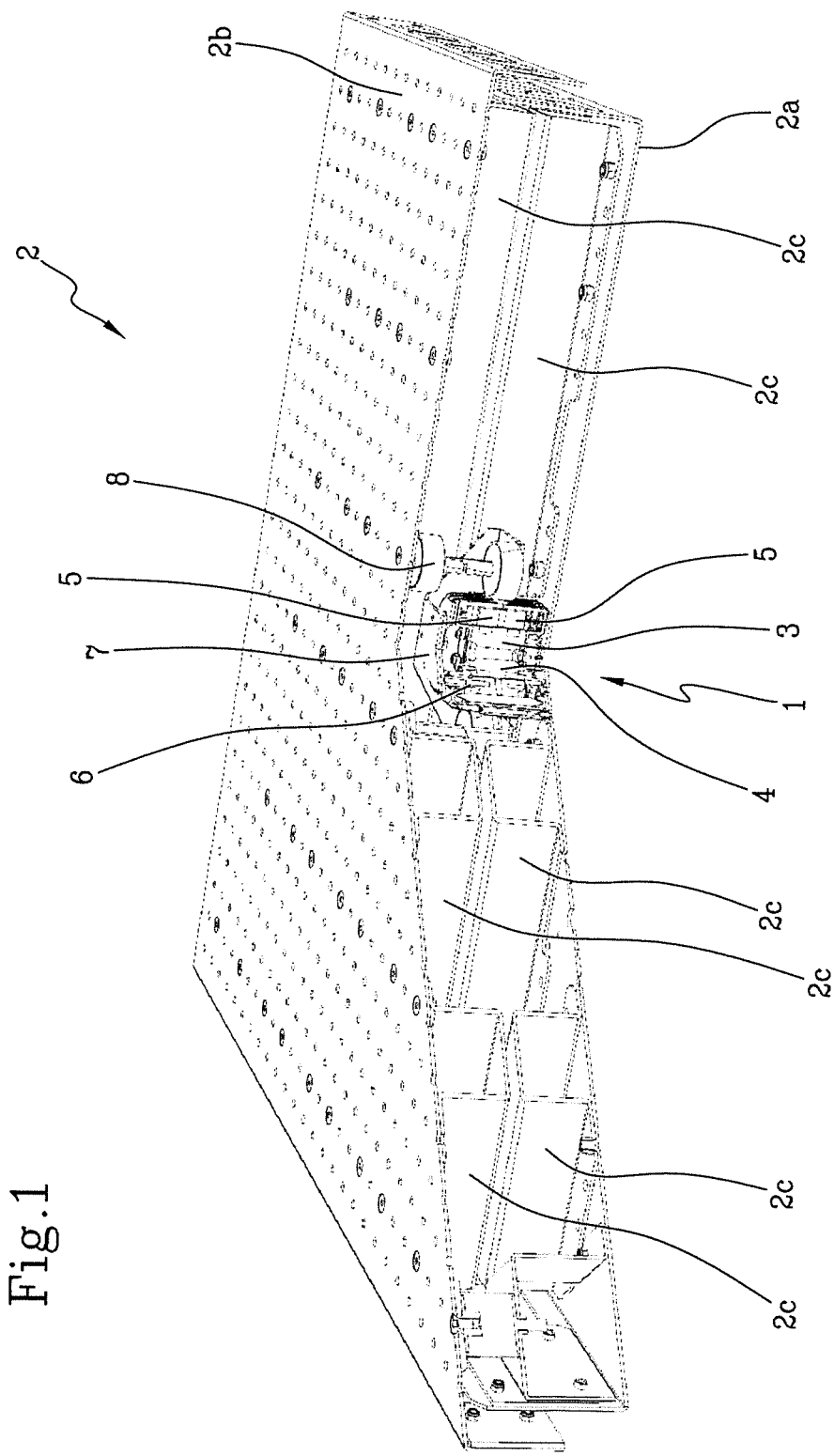
FIG. 1 is a perspective view of a platform provided with a control system for controlling the vibration that is the object of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner.

It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

With reference to the attached figures, 1 generally indicates a control system for controlling the vibration of a platform that, for simplicity of description, will be indicated as a control system 1.

A platform 2 is any component designed to make flooring treadable by a user (or that can be travelled along by a means of transport) or component of a chair designed for the support and/or the seating of a user.

Other embodiments are possible, provided that they require the presence of a body that has a reduced surface and height/thickness that are reduced with respect to the surface like for example, still remaining in the context of seating, a chair back.

The platform 2 illustrated in FIG. 1 is provided with a fixed lower support 2a and an upper support 2b.

The lower support 2a is configured to fix the platform 2 to flooring or to a seat or to other equivalents.

The upper support 2b is the one with which the users interact and which is designed to transmit the vibration to the user.

The lower support 2a and the upper support 2b are so shaped that in a closed configuration of the platform 2, the lower support 2a and the upper support 2 give the platform 2 a tile or similar shape (with a rounded or square or rectangular or other type of shape) in which the thickness is reduced with respect to a surface defining the extension of the lower support 2a and of the upper support 2b.

In other words, the lower support 2a and the upper support 2b define an internal volume of the platform 2.

Preferably, the platform 2 comprises a plurality of intermediate bodies 2c interposed between the lower support 2a and the upper support 2b.

In particular, the intermediate bodies 2c are reinforcements that can have an elongated or more compact shape and are positioned so as to occupy the volume formed by the lower support 2a and the upper support 2b.

In other words, the intermediate bodies 2c are positioned inside the internal volume of the platform 2, occupying as much space thereof as possible.

Preferably, the intermediate bodies 2c can have a total height that covers the entire thickness of the platform 2 or, as in the attached figures, can be made of several components, some associated with the lower support 2a and others with the upper support 2b.

The control system 1 comprises at least one vibration generator 3 located inside the platform 2 (in other words inside the internal volume of the platform 2) between the intermediate bodies 2c and an electric circuit (not illustrated) for running the vibration generator 3 in function of an audio and/or video signal.

In particular, the electric circuit receives an audio and/or video signal from another device (for example a PC connected to a console of a DJ, or the console for video games or a TV/disc reader that are reproducing a film or other video file) and on the basis of this signal sends energy to the vibration generator 3 so as to reproduce a vibration that reproduces a physical sensation in relation to the aforesaid signal (whether audio and/or video).

In detail, the vibration generator 3 will generate a vibration that will extend between said intermediate bodies (if present) to vibrate the entire surface of the upper support 2b (or at least one portion of the upper support 2b).

The vibration corresponds to a direct movement of the upper support 2b.

In particular, the electric circuit comprises a coil that is designed to vibrate a given component of the vibration generator 3.

In detail, the vibration generator 3 comprises a stator body 4, at least one vibrating body 5, which is concentric relative to the stator body 4 itself, and at least one magnet 5a associated with the vibrating body 5 itself.

In particular, the vibrating body 5 and the magnet 5a are concentric relative to the stator body 4 and arranged in a perimeter position outside the stator body 4.

The stator body 4, as shown in the attached figures, is located in a central position of the platform 2.

In particular, the coil of the electric circuit is wound around the stator body 4.

Preferably, the stator body 4 extends along a stator body 4 axis of extension "X" that is perpendicular to the upper support 2b plane of the platform 2.

Preferably, the stator body 4 has a substantially cylindrical shape.

Still more preferably, the stator body has an inner cavity 4a that is parallel and concentric relative to the axis of extension "X".

The inner cavity 4a is shaped for generating an air gap in the magnetic circuit of the control system 1 itself.

As illustrated in the attached figures, the stator body 4 comprises seats 4b designed to receive the coil of the electric circuit so that when the coil is traversed by an electric current, the coil generates a magnetic field that vibrates at least the one vibrating body 5.

With regard to the at least one vibrating body 5, it is made of ferromagnetic material and is configured to vibrate the upper support 2b relative to the lower support 2a.

Preferably, the vibrating body 5 is configured to vibrate with a translation movement parallel and/or transverse to the axis of extension "X" of the stator body as a function of the audio and/or video signal.

In particular, the electric circuit, once the audio and/or video signal has been received, sends a current to the coil wound around the stator body 4 so as to generate the aforesaid magnetic field that vibrates the vibrating body 5 in function of the aforesaid audio and/or video signal.

In other words, the magnetic field is variable as a function of the audio and/or video signal.

The electric circuit is configured to manage the intensity of the vibration of the vibrating body 5 on the basis of the audio and/or video signal received.

If the sound is particularly high, the vibration has an intensity of a certain level, if the sound is less than the preceding sound, also the vibration has a lesser intensity.

In other words, on the basis of the audio and/or video signal received, the electric circuit will regulate the intensity of the magnetic field generated by the coil so as to regulate the vibration of the at least one vibrating body 5.

Preferably, the vibrating body 5 is made in the form of a disc that is concentric relative to the stator body 4 (or concentric relative to the axis of extension "X" of the stator body 4).

This embodiment is preferably suitable when the stator body 4 is made with a substantially cylindrical shape. Similarly, in this embodiment the magnet 5a is made in the shape of a disc that is concentric relative to the stator body 4.

Preferably, as illustrated in the attached figures, the vibration generator 3 comprises at least two vibrating bodies 5 that are concentric relative to the stator body.

The two vibrating bodies 5 are associated with the magnet 5a, which keeps the two vibrating bodies 5 together. In particular, the magnet 5a is interposed between the two vibrating bodies 5.

Preferably, two magnets 5a can be present that are associated with a respective vibrating body 5.

Figure 3:
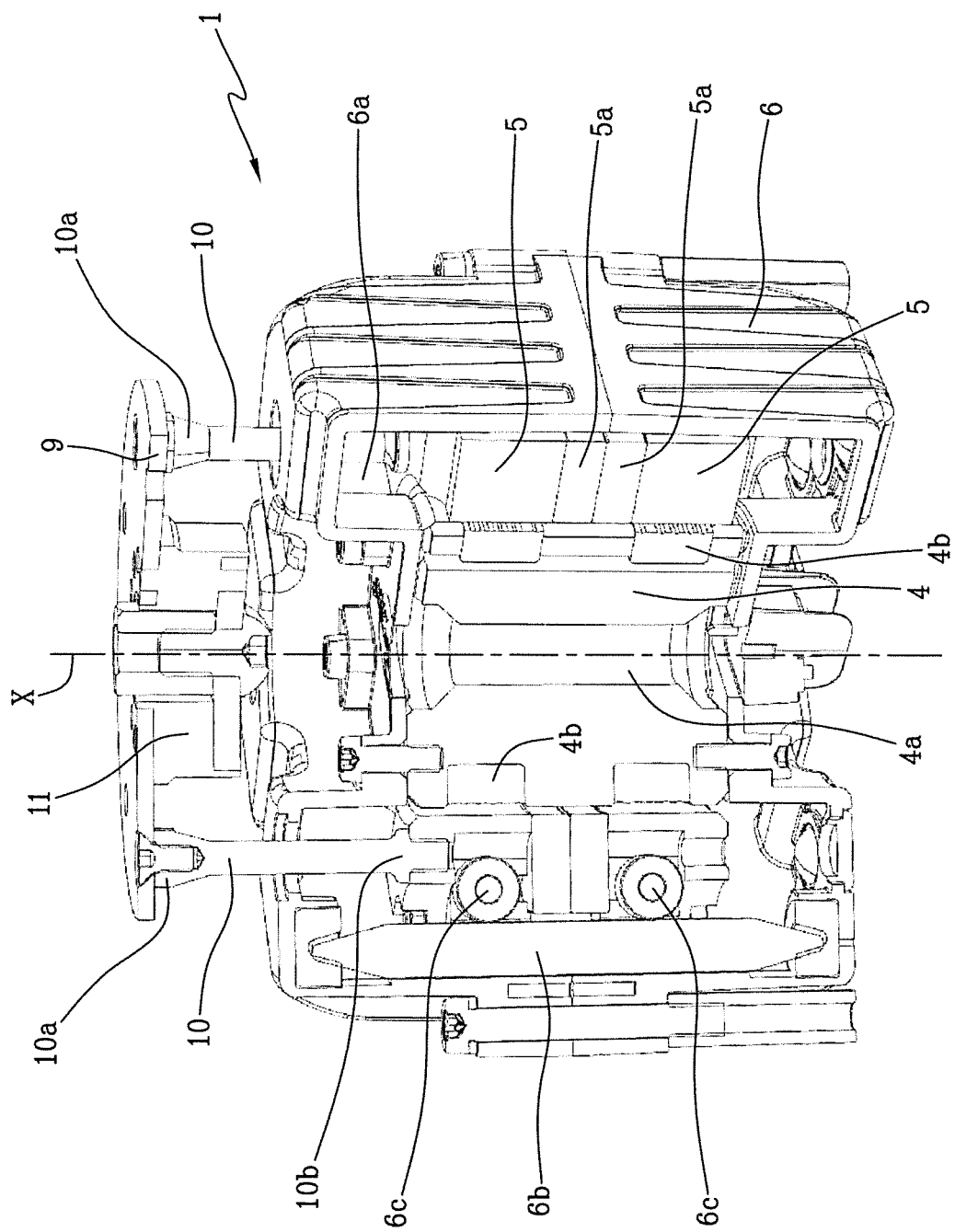
FIG. 3 is a perspective view of a control system that is an object of the present invention according to a further embodiment.

In FIG. 3, two magnets 5a are shown that are interposed and associated with the respective vibrating bodies 5.

Preferably, the magnet 5a (or the magnets 5a) can be glued on the vibrating bodies 5.

The two vibrating bodies 5 are configured to vibrate, solidly constrained to the magnet 5a that joins the two vibrating bodies 5 relative to the stator body 4 as a function of the audio and/or video signal.

In particular, the two vibrating bodies 5 are made of ferromagnetic material and are vibrated by the magnetic field generated by the coil wound around the stator body 4.

Preferably, both the vibrating bodies 5 can be made in the shape of discs that are concentric relative to the axis of extension "X" of the stator body 4 and are thus able to vibrate with a movement parallel to the axis of extension "X" itself Preferably, the control system 1 comprises a protective shell 6 of the vibration generator 3.

In particular, the protective shell 6 is designed to protect the vibration generator 3 and at the same time to enable the vibration generator 3 to transmit vibration to the upper support 2b, being constrained on the lower support 2a.

The protective shell 6 is shaped for improving the stability of the stator body 4, in particular so as to prevent the protective shell 6 being able to be vibrated by the vibrating bodies 5.

In detail, the protective shell 6 is shaped for maintaining a lower portion and an upper portion of the stator body 4 firmly stable, as shown in the attached figures.

For the purposes of the present invention, in a non-limiting manner, screws with corresponding bolts are present that secure the stator body 4 firmly to the protective shell 6.

The protective shell 6 further comprises seats 6a shaped for housing the vibrating bodies 5.

Further, the seats 6a of the protective shell are so shaped as to permit the vibration of the vibrating bodies 5, in particular permitting a preset stroke of the vibrating bodies 5 according to a direction parallel to the axis of extension "X" of the stator body 4.

Preferably, the control system 1 comprises ceramic guides 6b or guides of another very hard material, arranged parallel to the axis of extension "X" of the stator body 4 and on which the at least one vibrating body 5 slides within at least one seat 6a (or, as in the illustrated figures, the two vibrating bodies 5).

In other words, the at least one vibrating body 5 slides on the ceramic guides 6b along the preset stroke defined by the at least one seat 6a.

Preferably, the control system 1 further comprises rotary bearings 6c interposed between the ceramic guides 6b and the at least one vibrating body 5 as in the embodiment of FIG. 3.

The rotary bearings 6c enable the at least one vibrating body 5 to slide on the ceramic guides 6b within the at least one seat 6a (or, as in the illustrated figures, the two vibrating bodies 5).

In other words, the at least one vibrating body 5 slides on the ceramic guides 6b (by the rotary bearings 6c) along the preset stroke defined by the at least one seat 6a.

Advantageously, this embodiment enables the movement of the vibrating bodies 5 to be improved in order to reduce the friction and thus better transmit the vibration from the vibrating bodies 5 to the upper support 2b, it further enables the system to support easily loads that are not parallel to the axis of the main movement without undergoing damage.

Preferably, the control system 1 comprises a transmission structure 7 and at least one damper 8.

The transmission structure 7 is operationally interposed between the vibration generator 3 and the damper 8.

Preferably, the transmission structure 7 is interposed between the at least one vibrating body 5 and the damper 8.

The transmission structure 7 is shaped for transmitting the vibration from the vibration generator 3 to the at least one damper 8.

In particular, the transmission structure 7 has shafts 7a stacked in portions of said at least one vibrating body 5 (or at least two vibrating bodies 5) and a plate 7b communicating with said damper 8.

As illustrated in the attached figures, when the vibrating bodies 5 are vibrated they transmit the vibration to the transmission structure 7 (in particular to the shafts 7a that will transmit the vibration to the plate 7b), which transmits the vibration to the at least one damper 8.

The damper 8 enables the vibration to be dampened so as to dampen stress that is not parallel to the axis of extension "X" of the stator body 4.

In FIG. 3, a further embodiment of the control system 1 is shown.

The control system 1 comprises a supporting plate 9 associated with the upper support 2b and transmission columns 10 for transmitting vibration.

The transmission columns 10 are associated at a first end 10a with the supporting plate 9 and at a second end 10b with the at least one vibrating body 5 (if there are two vibrating bodies 5 as in the attached figures, the second end 10b is associated with the vibrating body 5 nearest the upper support 2b).

The supporting plate 9 is provided with an elastic coupling element, for example a silent block 11 configured to dampen stress not parallel to the axis of extension "X" of the stator body 4.

The silent block 11 is shaped for dampening this stress so as to protect the control system 1 itself, preventing that the at least one vibration generator 3 can be damaged.

In FIG. 3, this embodiment is provided with the rotary bearings 6c but the embodiment can be achieved without the vibrating bodies 5 sliding along the ceramic guide 6b.

Both the above disclosed embodiments of the control system 1 are made so as to dampen any type of vibration (and thus movement of the vibrating body 5) that is not vertical movement.

In other words, a movement of the vibrating body 5 must be matched by an equivalent movement of the upper support 2b relative to the lower support 2a.

For example, if the vibrating body 5 vibrates by moving by 1 mm, the upper support 2b has to move by 1 mm relative to the lower support 2a.

The equivalent movement of the upper support 2b relative to the lower support 2a is of axial type (parallel to the axis of extension "X").

Figure 2:
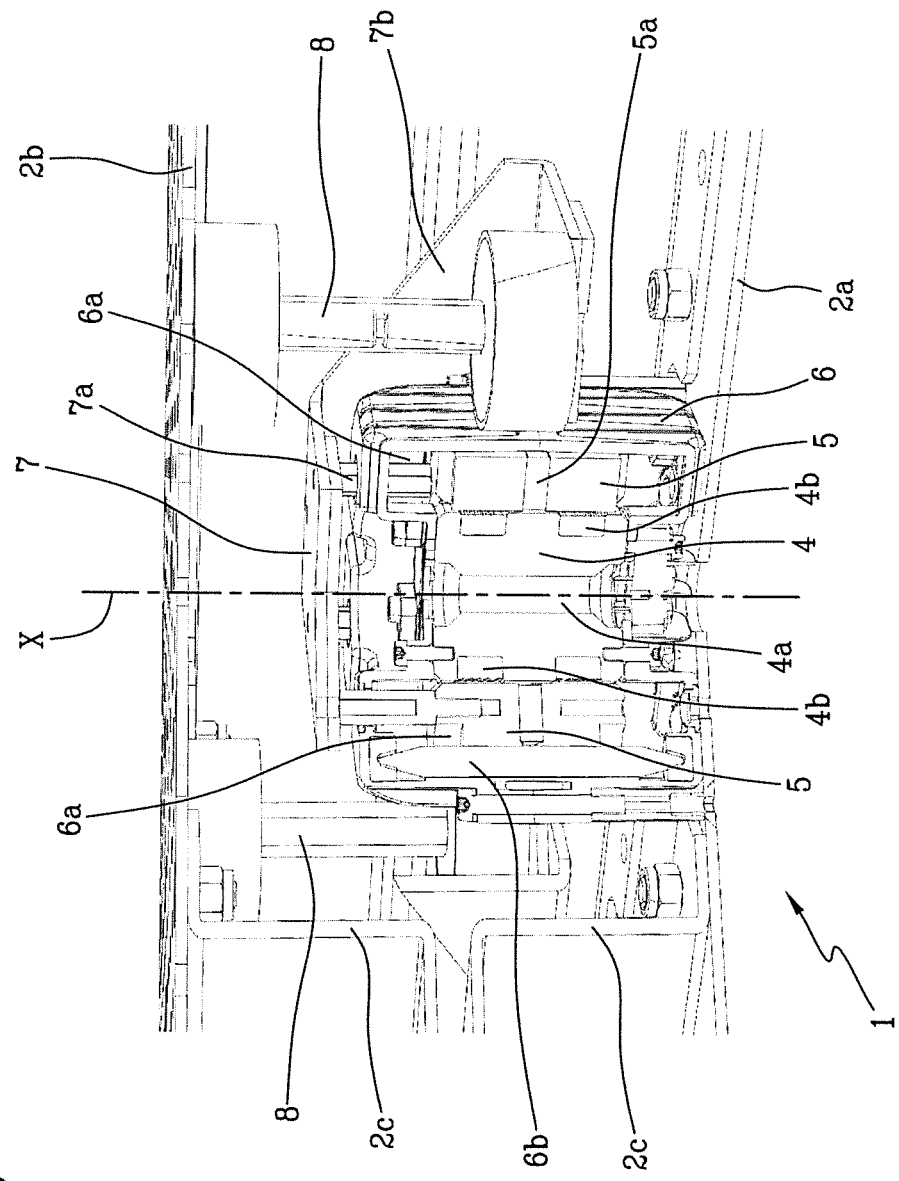
FIG. 2 is a perspective view of a detail of the platform provided with a control system for controlling the vibration of FIG. 1.

Preferably, the control system 1 disclosed above (according to the embodiment of FIG. 2 and/or of FIG. 3) comprises a plurality of vibration generators 3 located inside the platform 2 between the intermediate bodies 2c.

In particular, the vibration generator 3 are equidistant from one another (with a grid distribution) so as to vibrate different sectors of the upper support 2b of the platform 2.

By using a plurality of vibration generators 3 on the same platform 2, for example by placing the vibration generators 3 at the corners of the platform 2, it is possible to obtain, by synchronism thereof, precise movement of the upper support 2b relative to the lower support 2a.

Merely by way of example, it is possible to tilt the platform 2, or to give the platform 2 also undulating or rotational motion of significant intensity.

The electric circuit further comprises a number of coils equal to the number of vibration generators 3.

Advantageously, this embodiment enables the realism of the vibration transmitted to the user to be increased.

Further, this embodiment enables the surface to be increased that can be made to vibrate.

The present invention further relates to a seat comprising the control system 1 disclosed above.

In particular, seating of the seat (whether an armchair, a seat provided with a cushion or the like), or a seating plane of a user coincides with the platform 2 mentioned above.

In detail, the upper support 2b coincides with the seating plane of the user that, as a function of the audio and/or video signal, receives vibrations designed to simulate the physical sensation of what is occurring on the screen.

The present invention further relates to flooring that comprises a plurality of platforms 2 each comprising a control system 1 like that disclosed above.

Or a single platform 2 comprising a plurality of control systems 1 like the one disclosed above.

Each platform 2 can be made in the form comprising a single vibration generator 3 or a plurality of vibration generators 3.

In this manner, the upper support 2b of each platform 2 defines a plane treadable by one and/or more users and configured to transmit a vibration thereto as a function of the audio and/or video signal received from the electric circuit.

During use of the flooring, the upper support 2b can go to abut on the lower support 2a so as not to break the control system 1 and the components thereof can be enclosed within the volume defined by the upper support 2b and the lower support 2a themselves.

Advantageously, this solution enables the flooring to be travelled on also by heavy vehicles if the flooring is very extensive following installations of large dimensions.

The present invention further relates to a control method for controlling the vibration of a platform 2.

The control method provides the step of setting up a control system 1 like that disclosed previously and locating between the intermediate bodies 2c of the platform 2 at least one vibration generator 3. Preferably, if the control system 1 comprises a vibration generator 3, the method locates the vibration generator 3 itself in a central portion of the platform 2 itself.

Preferably, if the control system 1 comprises a plurality of vibration generators 3, the method locates the vibration generators 3 inside the platform 2 according to a distribution that is such as to occupy several sectors of the platform 2 itself with the vibration generators 3 that are equidistant from one another according to a grid distribution.

The method further connects the electric circuit to the vibration generator 3, in particular by winding the coil around the stator body 4 of the vibration generator 3.

The step follows of sending an audio and/or video signal to the electric circuit so as to generate a magnetic field from the coil wound around the stator body.

At this point, the step follows of vibrating the at least one vibrating body 5 by the magnetic field as a function of the audio and/or video signal so as to transmit the vibration to the platform 2. In particular, the method transmits the vibration from the vibration generator 3 to the upper support 2b.

The present invention is able to overcome the drawbacks that have emerged in the prior art.

Advantageously, the presence of a stator body 4 and of the vibrating bodies 5 that are externally concentric relative to a stator body 4 enable the ratio to be optimized between the masses involved and the vibration power generated.

Yet more advantageously, the control system 1 disclosed above enables transmission of the vibration to be obtained that is realistic relative to the audio and/or video signal and a vibration intensity that matches the aforesaid signal.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A system (1), for controlling the vibration of a platform (2) for audio and/or video applications, the platform being formed by a fixed lower support (2a) and an upper support (2b), the control system (1) comprising:
   at least one generator (3) of vibrations located inside the platform (2) between the lower support (2a) and the upper support (2b) and comprising a stator body (4), at least one vibrating body (5) and at least one magnet (5a) associated with the vibrating body (5) configured for vibrating the upper support (2b) with respect to the lower support (2a), the at least one vibrating body (5) and the at least one magnet (5a) being concentric relative to the stator body (4) and positioned in a perimeter position outside the stator body (4); and
   an electric circuit comprising a coil wound around the stator body (4) and designed to receive an audio and/or video signal for generating a magnetic field, by means of the coil, designed to vibrate the at least one vibrating body (5) of the at least one vibration generator (3) as a function of the audio and/or video signal, the vibration corresponding to a direct movement of the upper support (2b).

2. The control system (1) according to claim 1, further comprising:
   a structure (7) for transmission of the vibration and at least one damper (8), the transmission structure (7) being operatively interposed between the vibration generator (3) and the at least one damper (8) and being shaped for transmitting the vibration from the vibration generator (3) towards the at least one damper (8) configured to dampen stresses not parallel to an axis of extension (X) of the stator body (4).

3. The control system (1) according to claim 1, further comprising:
   a supporting plate (9) associated with the upper support (2b) and columns (10) for transmitting the vibration associated with a first end (10a) to the supporting plate (9) and with a second end (10b) to the at least one vibrating body (5), the supporting plate (9) being equipped with a silent block (11) configured to dampen stresses not parallel to an axis of extension (X) of the stator body (4).

4. The control system (1) according to claim 1, further comprising:
   a protective shell (6) for the at least one vibration generator (3) designed to transmit the vibration to the upper support (2b), the protective shell (6) being shaped in such a way as to improve the static nature of the stator body (4) when the at least one vibrating body (5) is vibrated and comprising at least one seat (6a) shaped in such a way as to allow a preset stroke of the at least one vibrating body (5).

5. The control system (1), according to claim 4, further comprising:
ceramic guides (6b) positioned parallel to an axis of extension (X) of the stator body (4) on which slide, in the at least one seat (6a), the at least one vibrating body (5).

6. The control system (1), according to claim 4, further comprising:
ceramic guides (6b) positioned parallel with an axis of extension (X) of the stator body (4) and rotary bearings (6c) operatively interposed between the ceramic guides and the at least one vibrating body (5) in such a way as to allow a sliding, in the at least one seat (6a), of the at least one vibrating body on the ceramic guides.

7. The control system (1), according to claim 1, wherein:
the stator body (4) has a substantially cylindrical shape and wherein the at least one vibrating body (5) has a disc shape.

8. The control system (1), according to claim 1, wherein:
the vibrating body (5) is configured for vibrating with a translational movement parallel to and/or transversal to an axis of extension (X) of the stator body as a function of the audio and/or video signal.

9. The control system (1), according to claim 1, further comprising:
at least two concentric vibrating bodies (5) outside the stator body (4), the vibrating bodies (5) being configured for vibrating relative to each other and both relative to the stator body (4) as a function of the audio and/or video signal.

10. The control system (1), according to claim 1, further comprising:
a plurality of vibration generators (3) located inside the platform (2) between the lower support (2a) and the upper support (2b), each of the generators vibrations being equi-spaced from each other in such a way as to vibrate different sectors of the upper support (2b) of the platform (2).

11. A seat comprising a system (1), for controlling the vibration of a platform (2), according to claim 1, wherein:
the upper support (2b) of the platform (2) coincides with a seating plane of a user and wherein the system (1) for controlling the vibration is configured to vibrate the seating plane as a function of an audio and/or video signal.

12. A flooring, comprising a plurality of platforms (2), each platform comprising a fixed lower support (2a), an upper support (2b) defining a surface treadable by a user and a system (1) for controlling the vibration of the platform according to claim 1, wherein:
said flooring is configured to vibrate the treadable surface as a function of an audio and/or video signal.

13. A method for controlling the vibration of a platform (2), comprising the steps of:
providing said platform (2) having a fixed lower support (2a) and an upper support (2b), and conducting said method comprising the steps of:
preparing a control system (1) according to claim 1;
placing between the lower support (2a) and the upper support (2b) of the platform at least one vibration generator (3);
connecting an electrical circuit to the vibration generator (3);
sending an audio and/or video signal to the electrical circuit;
generating a magnetic field from at least one coil of the electrical circuit as a function of the audio and/or video signal;
vibrating at least one vibrating body (5) of the at least one vibration generator (3) by means of the magnetic field as a function of the audio and/or video signal; and
transmitting the vibration from the vibration generator (3) to the upper support (2b) of the platform (2).

14. A control system (1) for controlling a vibration of a platform (2) for audio or video applications, wherein:
said platform comprises a fixed lower support (2a) and an upper support (2b); and
said control system (1) further comprises:
at least one vibration generator (3) internally located in said platform (2) between said lower support (2a) and said upper support (2b);
a stator body (4), at least one vibrating body (5) and at least one magnet (5a) associated with said vibrating body (5) configured to vibrate said upper support (2b) with respect to said lower support (2a) during a use;
said at least one vibrating body (5) and said at least one magnet (5a) being concentric with respect to said stator body (4) and arranged in a perimetric position external to said stator body (4);
an electric circuit, comprising:
a coil wound around said stator body (4) and adapted to receive an audio or video signal to generate a magnetic field, through said coil, suitable to put in vibration said at least one vibrating body (5) of said at least one vibration generator (3) as a function of said signal;
said vibration corresponding to a direct displacement of said upper support (2b).

* * * * *